Jan. 31, 1967 T. STUTZ 3,302,009
PARALLEL ADDER FOR BINARY CODED NUMBERS
Filed May 6, 1964
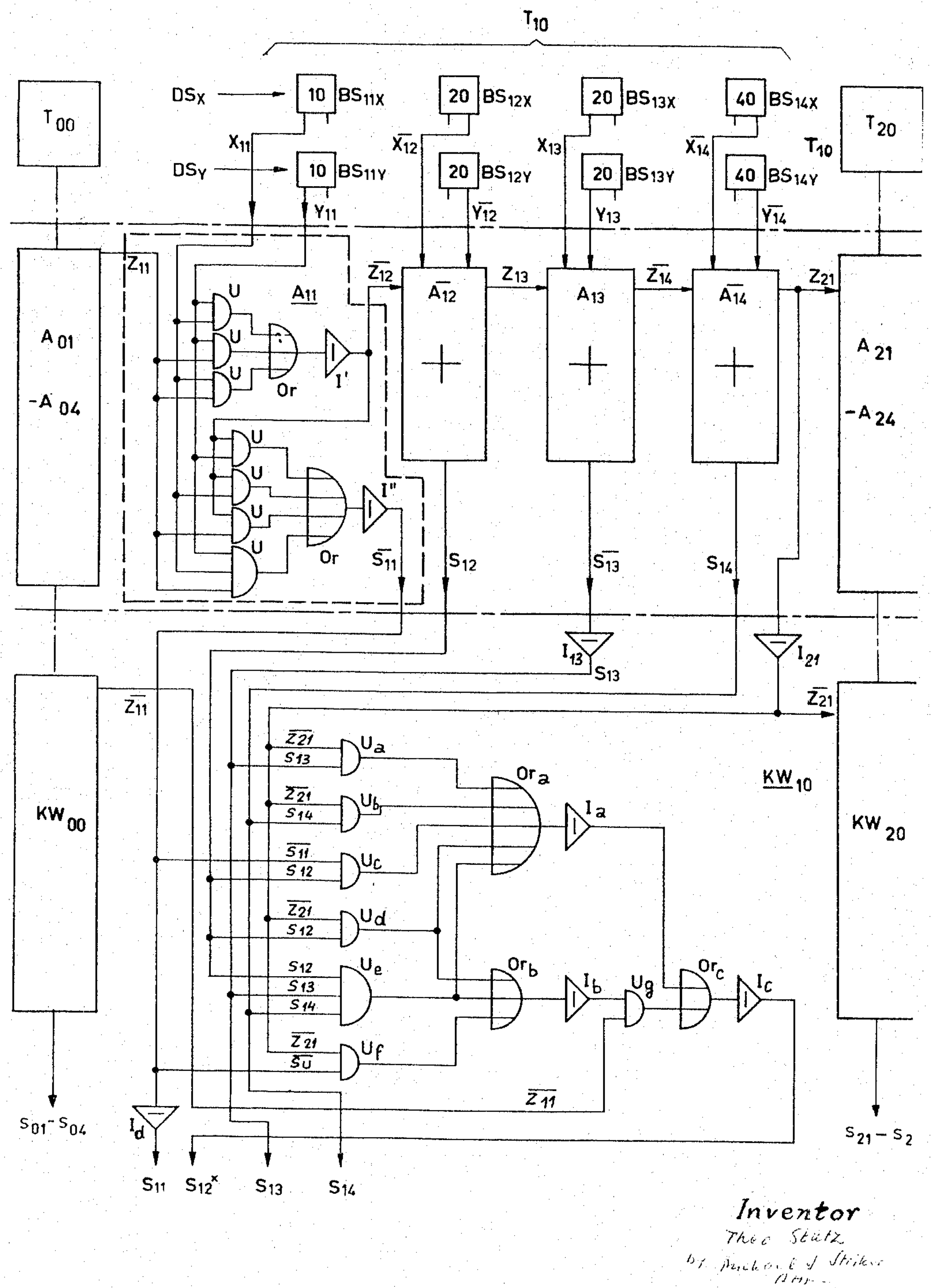
Inventor
Theo Stutz
by [illegible]
Atty.

United States Patent Office 3,302,009

Patented Jan. 31, 1967

3,302,009

PARALLEL ADDER FOR BINARY CODED NUMBERS

Theo Stutz, Zollikerberg, Switzerland, assignor to Contraves AG., Zurich, Switzerland Filed May 6, 1964, Ser. No. 365,443
Claims priority, application Switzerland, May 7, 1963, 5,715/63
4 Claims. (Cl. 235—174)

The present invention concerns a parallel adding arrangement for adding four-bit combinations representing decimal numbers as augends and addends in terms of a weighted binary code. In particular, an adding arrangement of this kind is designed to cooperate with storage units respectively assigned to different consecutive decimal order positions of decimal numbers to be added. Each storage unit includes a first and a second group of four storage elements for storing in terms of a four-bit weighted binary code in said first group of elements a four-bit combination representing the decimal digit of the augend in the respective decimal order position thereof and for storing in said second group of elements a four-bit combination representing the decimal digit of the addend in the respective decimal order position thereof. Moreover, a series of binary adding devices are respectively associated with said storage units, each of these adding devices including a group of four binary adders respectively connected with a different one of said pairs of correlated storage elements of the respectively associated storage unit for adding binary bits stored in said pairs of correlated storage elements, and furnishing at its output terminal the binary sum of said bits and, whenever applicable, a transfer bit, so that at the outputs of these adders appears a bit combination which in accordance with the code represents the correct sum of the decimal digits that were intended to be added. However, a correcting network is provided in combination with each adding device in order to carry out certain corrections in the course of the adding operation so that the final result is correct.

It has been found that particular advantages are obtainable if an arrangement of the general type mentioned above is so constructed that a novel type of a weighted code of four-bit combinations in binary notation can be used in its operation.

It has been further found desirable to develop a special type of correcting networks as mentioned above which take advantage of the particular type of this new code.

It is therefore one object of this invention to provide for a parallel adding arrangement of the general class and type mentioned above and which in a most advantageous and efficient manner permits the utilization of a special four-bit binary code.

It is another object of this invention to provide for an arrangement as set forth which comprises a novel type of correcting networks which under the condition of using that novel code introduces all those corrections that are necessary in the operation of ordinary binary adding devices.

With above objects in view the invention includes in a parallel adding arrangement for adding four-bit combinations representing decimal numbers as augends and addends in terms of a weighted-bit binary code, in combination, a series of storage units respectively assigned to different consecutive decimal order positions of decimal numbers to be added, each unit including a first and a second group of four storage elements for storing in terms of a four-bit weighted-bit binary code in said first group of elements a four-bit combination representing the decimal digit of the augend in the respective decimal order position thereof and for storing in said second group of elements a four-bit combination representing the decimal digit of the addend in the respective decimal order position thereof, each element of said first group being assigned to a different binary order position and constituting with the corresponding element of said second group assigned to the same binary order position a pair of correlated storage elements, said weighted binary code being defined by the following chart:

BIT POSITIONS $BS_n$ WITH WEIGHTS $g_x$

| Decimal Digit | BS4 g=4 | BS3 g=2 | BS2 g=2 | BS1 g=1 | BS4 g=4 | BS3 g=2 | BS2 g=2 | BS1 g=1 | Decimal Digit |
|---|---|---|---|---|---|---|---|---|---|
| 0 | O | O | O | O | L | L | L | L | 9 |
| 1 | O | O | O | L | L | L | L | O | 8 |
| 2 | O | O | L | O | L | L | O | L | 7 |
| 3 | O | L | O | L | L | O | L | O | 6 |
| 4 | O | L | L | O | L | O | O | L | 5 |

a series of binary adding devices respectively associated with said storage units, each of said adding devices including a group of four binary adders respectively connected with a different one of said pairs of correlated storage elements of the respectively associated storage unit for adding binary bits stored in said respectively connected pairs of correlated storage elements, and furnishing at its output terminal the binary sum of said bits stored in the respective correlated storage elements and, whenever applicable, a transfer bit to the following one of said adders connected with a pair of correlated elements associated with the respectively next higher binary order position, each of said adding devices having a group input for receiving a transfer bit from a preceding adding device associated with a storage unit assigned to a respectively next lower decimal order position, and a group output for transferring a transfer bit to a following adding device associated with a storage unit assigned to the respectively next higher decimal order position; a series of correcting networks respectively associated with said binary adding devices, each of said correcting networks being connected with said output terminals of the respective four binary adders of a different one of said binary adding devices, and with the respective group output and including a transfer input and logical circuit means permitting the unchanged passage therethrough of the binary sums furnished by said binary adders of the particular adding device with the exception of a selected one of said four binary adders namely the one assigned to the second lowest binary order position and converting the binary sum furnished by said selected binary adder into a corrected binary sum in accordance with the following Boolean equation:

$$S_{12}^* = \overline{Z_{21}}[S_{12}+(S_{13}+S_{14})(\overline{S_{11}}+Z_{11})] + S_{12}(S_{13}S_{14}+Z_{11}\overline{S_{11}})$$

wherein $S_{12}$ is the binary sum furnished by said selected binary adder, while $S_{12}^*$ is the corresponding corrected binary sum, $S_{11}$, $S_{13}$ and $S_{14}$ are the binary sums respectively furnished by the other three of said four binary adders, $Z_{11}$ is the transfer introduced at said group input and $Z_{21}$ is the transfer delivered at said group output; and a series of output means respectively associated with said adding devices, each of said output means comprising for a different one of said correcting networks, respectively, a group of three outputs for said binary sums passed unchanged through the particular correcting network and one output for said corrected binary sum furnished thereby.

The novel features which are considered as characteristic for the invention are set forth in particular in the appended claims. The invention itself, however both as to its construction and its method of operation, together with additional objects and advantages thereof, will be best understood from the following description of specific embodiments when read in connection with the accompanying drawing in which an embodiment of the invention is illustrated in the form of a schematic circuit diagram.

It is to be understood that conventionally a parallel adding arrangement of the type here contemplated is so constructed that multi-order decimal numbers can be added by adding four-bit combinations representing each only one digit in a selected decimal order position of the augend and addend, respectively, decimal numbers. Consequently, the center portion of the drawing illustrates in comparatively greater detail the circuit arrangements within that portion of the entire arrangement which is designed to process the decimal digits in the second decimal order position of the decimal numbers to be added, while to the left of the center portion is indicated in block diagram style a corresponding identical unit which is intended to process the corresponding decimal digits in the first decimal order position, and similarly at the right hand of the center portion the block diagrams illustrates a further similar unit which is to deal with the decimal digits in the third decimal order position of the respective numbers.

Consequently, in the illustrated example which comprises arrangements for processing three-digit decimal numbers a series of three storage units $T_{00}$, $T_{10}$ and $T_{20}$ is provided and shown above the separation line X, a series of binary adding devices shown between the separation lines X and Y and comprising a first group of binary adders $A_{01}$–$A_{04}$ associated with the storage unit $T_{00}$, in the center a binary adding device including the binary adders $A_{11}$–$A_{14}$, associated with the storage unit $T_{10}$, and finally a third adding device composed of the binary adders $A_{21}$–$A_{24}$ associated with the third storage unit $T_{20}$. Moreover, the arrangement comprises correcting networks namely a first correcting network $KW_{00}$ associated with the storage unit $T_{00}$, a correcting network in the center marked $KW_{10}$ associated with the storage unit $T_{10}$, and a correcting network $KW_{20}$ associated with the storage unit $T_{20}$. As will be seen further below the various units are connected with each other for the purpose of shifting transfer bits in a proper fashion from units assigned to lower decimal order positions to units assigned to higher decimal order positions.

In order to describe the invention it will be sufficient to describe the details of the more completely illustrated central group of units assigned to a selected decimal order position, namely the second decimal order position of the decimal numbers to be processed.

Referring now to the central portion of the diagram it can be seen that the storage unit $T_{10}$ comprises a first group $DS_X$ of four storage units $BS_{11X}$, $BS_{12X}$, $BS_{13X}$ and $BS_{14X}$. These storage units are of entirely conventional design and capable of storing in well known manner either one of the two possible binary bits O and L. Since the code to be dealt with is a weighted-bit binary code of the type 4, 2, 2, 1 and since a storage unit $T_{10}$ is assigned to the second decimal order position i.e. to the tens, the weight of the bits L when stored in the above mentioned storage elements would be as marked in the drawing: 10, 20, 20, 40, respectively. The storage unit $T_{10}$ comprises a second groove $DS_Y$ of four storage elements $BS_{11Y}$, $BS_{12Y}$, $BS_{13Y}$ and $BS_{14Y}$. For obvious reasons the weights of the bits L that may be stored in these last mentioned storage elements would also be 10, 20, 20, 40, respectively.

It will be understood that the individual storage elements of these two groups thereof, counting from left to right, are respectively assigned to, and associated with, the consecutive order positions of a four-bit combination. Accordingly, those storage elements of the two groups which are assigned to the same binary order position as for instance $BS_{11X}$ and $BS_{11Y}$ constitute pairs of correlated storage elements. It may be added here that the individual storage elements may be constructed in well known manner in the form of flip-flop counting stages with transistors. Each of the storage elements has an output which may be used for transmitting a stored bit to the adding devices described further below. For the purpose of reference the outputs of the first group $DS_X$ are marked with a symbol which also represents the bit stored in the respective element or rather the condition in which the particular element finds itself during storage of such a bit. The outputs of the first group $DS_X$ are marked $X_{11}$, $X_{12}$, $X_{13}$ and $X_{14}$, respectively. In a similar manner and for the same reasons the outputs of the elements of the group $DS_Y$ are marked $Y_{11}$, $Y_{12}$, $Y_{13}$ and $Y_{14}$, respectively.

Before proceeding with the description of the diagram now the special weighted-bit binary code which forms the basis of the present invention will be described. The ten possible decimal values of the decimal digits in the "tens" order position are associated in accordance with the following code chart with certain four-bit combinations stored respectively in the four binary storage elements:

CODE CHART

[Binary storage elements and weights G of bits stored]

| Decimal Digit | $BS_{14}$ g=40 | $BS_{13}$ 20 | $BS_{12}$ 20 | $BS_{11}$ 10 | $BS_{14}$ 40 | $BS_{13}$ 20 | $BS_{12}$ 20 | $BS_{11}$ 10 | Decimal Digit |
|---|---|---|---|---|---|---|---|---|---|
| 0 | O | O | O | O | L | L | L | L | 9 |
| 1 | O | O | O | L | L | L | L | O | 8 |
| 2 | O | O | L | O | L | L | O | L | 7 |
| 3 | O | L | O | L | L | O | L | O | 6 |
| 4 | O | L | L | O | L | O | O | L | 5 |

The above code which may be called for the purpose of identification the "CZ-code" has not been published by the inventors up to now but has been disclosed and described in greater detail in our copending United States patent application Serial No. 279,039 filed May 6, 1963, now abandoned. It has been found that this code has definite advantages over other similar code systems e.g. the known "Aiken-code" particularly if the binary coded equivalents of decimal digits stored in storage units are to be parallel-added in accordance with the rules of the pure binary addition. No arrangement has been known up to now which is particularly suited for, and capable of, adding in this manner the bit combinations of the above CZ-code.

Referring again to the drawing, it can be seen that of the adding device including the group of four binary adders $A_{11}$, $\overline{A_{12}}$, $A_{13}$ and $\overline{A_{14}}$ only the first one is illustrated in complete detail while the other adders are shown only in block diagram form because they are entirely identical with the adder $A_{11}$. The binary adder $A_{11}$ is connected with the outputs $X_{11}$ and $Y_{11}$ of the respectively associated pair of correlated storage elements $BS_{11X}$ and $BS_{11Y}$ and with the group input $Z_{11}$ for receiving a transfer bit from the stage assigned to the next lower decimal order position. The adder $A_{11}$ comprises logical circuit means namely AND-circuits U, OR-circuits Or and inverter circuits I for producing upon the input of bits through inputs $X_{11}$, $Y_{11}$ and $Z_{11}$, a transfer bit $\overline{Z_{12}}$ to be transmitted to the next following adder $\overline{A_{12}}$ and a binary sum $S_{11}$ at its output terminal in accordance with the Boolean equations:

$$\overline{Z_{12}}=X_{11}Y_{11}+X_{11}Z_{11}+Y_{11}Z_{11}$$

$$\overline{S_{11}}=X_{11}\overline{Z_{12}}+Y_{11}\overline{Z_{12}}+X_{11}Y_{11}Z_{11}$$

It can be seen easily from the drawing that the illustrated combination of logical circuits is fully capable to operate in this manner.

It appears to be advisable at this point to furnish some explanations of certain symbols used above and in the drawing. It is well known that in the field of mathematical logical and Boolean algebra functions or conditions are represented by capital letters like A, B, etc. The inverse value of such function or condition is represented by a capital letter with a line drawn above it as for instance $\overline{A}$, $\overline{B}$. For instance in the drawing such inverse value symbols occur at $\overline{X_{12}}$, $\overline{Y_{12}}$, $\overline{Z_{12}}$ and $\overline{A_{12}}$. In order to understand why and how these inverse values appear in the system it must be borne in mind that usually networks as those which are described above and intended to be components of the arrangement according to the invention, particularly combinations of AND-circuits and OR-circuits must be combined usually with an amplifier downstream in order to amplify the signals which have passed through the just mentioned circuits. A simple transistor amplifier acts as is well known as an inverter. If this inversion effect is to be avoided then one would have to use two transistor amplifiers in series. Since this is not entirely desirable the arrangements according to the invention and as illustrated usually are provided with only one transistor amplifier stage which results in inversion. However, in certain cases an inverting amplifier is purposely provided in order to invert an inverted output from any one of the components of the arrangement.

For instance, the binary adder $A_{11}$ comprises the inverting amplifiers I′ and I″. Consequently the transfer bit to the next following adder $\overline{A_{12}}$ has the inverted value $\overline{Z_{12}}$ and consequently the output of the adder $\overline{A_{12}}$ which is constructed like $A_{11}$ will be the non-inverted bit value $S_{12}$. This however calls for supplying to the adder $\overline{A_{12}}$ the bits from the corresponding correlated pair of storage elements $BS_{12X}$ and $BS_{12Y}$ in the form of inverted values $\overline{X_{12}}$ and $\overline{Y_{12}}$, respectively. The transfer $Z_{13}$ is non-inverted and so are the inputs $X_{13}$ and $Y_{13}$ into the adder $A_{13}$. The transfer from this adder is again inverted $\overline{Z_{14}}$ and consequently the conditions applying to the fourth adder $\overline{A_{14}}$ are the same ones as those applying to the second adder $\overline{A_{12}}$. Of course the output from the adder $A_{13}$ is inverted $\overline{S_{13}}$ which requires the provision of the inverting amplifier $I_{13}$ in order to produce a non-inverted output signal $S_{13}$.

It will be understood that in the above manner and with the above described equipment four-bit combinations representing decimal digits can be added in accordance with the rules of plain binary addition in parallel action. For instance, the task of adding two three-digit decimal numbers would yield at the output terminals of the three binary adding devices respectively associated with the storage units $T_{00}$, $T_{10}$ and $T_{20}$ the three four-bit combinations $S_{01}$, $S_{02}$, $S_{03}$, $S_{04}$,; $S_{11}$, $S_{12}$, $S_{13}$, $S_{14}$; $S_{21}$, $S_{22}$, $S_{23}$, $S_{24}$. All these combinations are based on the only possible binary conditions O or L. However, if the binary bit combinations of this sum are interpreted in accordance with the weights which are assigned according to the above chart of the CZ-code to the bits L in the indvidual binary order positions, then it will be found that in certain cases the results are not correct. Therefore it is necessary to supplement each parallel adding device i.e. each group of four binary adders by a corresponding correcting network KW as shown in the drawing for instance as $KW_{00}$, $KW_{10}$ and $KW_{20}$. Each of these correcting networks is connected with the output terminals of the respectively associated group of four binary adders and with the serially preceding and following correcting network and contains a combination of logical circuits whereby the combination of binary sums furnished by the binary adders is corrected in such a manner that at the output terminals of the correcting network a four-bit combination appears which by applying the weights specified by the above chart to the individual bits L in that combination the correct decimal sum of the original two added decimal digits is represented.

It is already known to use in connection with a parallel adding arrangement handling binary coded bit-combinations representing decimal digits on the basis of the Aiken-code a correcting network for eliminating errors of the type mentioned above. However, the above mentioned and illustrated CZ-code forming the basis of the present arrangement yields the remarkable advantage that a four-bit binary sum furnished by a group of four binary adders cannot contain an error in any one of the four binary order positions with the exception of one, namely in the binary order position of the second lowest significance which in the drawing would correspond to the second one of the four storage elements or binary adders counting from the left, and therefore in the present example would yield the binary sums $S_{02}$, $S_{12}$ or $S_{22}$.

Here below is a collection of examples of additions of four-bit combinations that can be carried out by the arrangement illustrated in the drawing and described above. In each example the first line marked $T_X$ is the augend both in decimal notation and represented by a four-bit combination, the second line marked $T_Y$ is the addend shown in the same manner. In the third line a transfer Z is indicated. There follows the sum of the binary four-bit combinations and of the decimal digits. In certain cases, as can be seen, this sum is not correct and requires a correction in order to arrive at the corrected sum indicated in the last line of the particular example.

| | | | | |
|---|---|---|---|---|
| $T_X$ | O L O L (3) | O L O L (3) | L O O L (5) | L O O L (5) |
| $T_Y$ | L O L O (6) | L O O L (5) | O L L O (4) | L L L O (3) |
| Z | O (0) | O (0) | L (1) | L (1) |
| | L L L L (9) | L L L O (8) | L O O O O (10) | L L O O O (14) |

In above examples evidently the plain binary addition results in four-bit combinations which correctly represents the sum of the corresponding decimal digits when the weights according to the CZ-code are applied to the bits L therein.

| | | | | |
|---|---|---|---|---|
| $T_X$ | O O L O (2) | L O L O (6) | O L O L (3) | O L L O (4) |
| $T_Y$ | O O L O (2) | O O L O (2) | O L L O (4) | O O O L (1) |
| Z | O (0) | O (0) | L (1) | L (1) |
| Sum | O L O O (2) | L L O O (6) | L L O O (6) | L O O O (4) |
| Corr | O L L O (4) | L L L O (8) | L L L O (8) | L O L O (6) |

| | | | | |
|---|---|---|---|---|
| $T_X$ | O L O L (3) | L L O L (7) | L O O L (5) | L L O L (7) |
| $T_Y$ | L L O L (7) | O L L O (4) | L L O L (7) | L L O L (7) |
| Z | O (0) | O (0) | L (1) | L (1) |
| Sum | L O O L O (12) | L O O L L (13) | L O L L L (15) | L L O L L (17) |
| Corr | L O O O O (10) | L O O O L (11) | L O L O L (13) | L L O O L (15) |

As can be seen in the second group of examples the plain binary addition results first of all in four-bit combinations which after application of the weights of the code would not represent correctly the sum of the corresponding decimal digits but are too small. Therefore in these cases a correction is required which however is restricted clearly only to the second binary order position counting from the right. This correction consists in the addition of a bit L in that position.

On the other hand, the last group of examples is characterized by the fact that in these cases the first obtained sum is too large and therefore requires also a correction which also in this case is restricted to the deduction of the bit L only in the second binary order position from the right. It should be noted that the above examples show that all these four-bit combinations representing a sum are to be considered to be correct or at least equivalent to those four-bit combinations which represent the respective decimal digit in accordance with the CZ-code chart. The only thing that matters is that the total sum of the weights of the bits L therein in accordance with the weight distribution in the chart is correctly representing the decimal digit while actually the particular four-bit combination may not occur at all in the code chart as indicated above. For instance, in the fourth example of the first group of examples above a four-bit combination L O O O appears which by applying the weight 4 to the bit L in the fourth binary order position must be accepted as being equivalent to the four-bit combination O L L O which according to the above chart represents the decimal digit 4. Similarly, in the second example of the last group thereof a four-bit combination O L L appears as a sum to represent the decimal digit 3 which is correct and shows that the irregular combination O L L is equivalent to the four-bit combination O L O L which according to the above chart represents the decimal digit 3. This equivalence is particularly real in all those cases where the sum obtained from the parallel adding device is not used for continuing a calculating operation but serves only either for a visual indication of the result of the addition in connection with the weight assignment according to the code (4 2 2 1) or serves for obtaining an analog value corresponding to the total weight of the bits L in such sum, e.g., for controlling a servo-motor arrangement or drive. Such conditions are present particularly in well known selsyn arrangements the function of which is to adjust a momentarily existing value of a variable quantity so as to assume by servo-motor action a desired or predetermined intended value.

Summing up, it can be seen that in the case of binary addition of four-bit combinations stored in accordance with a four-bit code of the CZ type no errors can occur in the addition which could not be corrected by adding or subtracting a bit of a predetermined weight only in the binary order position which has the second lowest significance, i.e., the second position from left within the groups of components illustrated in the drawing.

A careful analysis of all possible cases of parallel addition of four-bit combinations based on the above CZ-code shows that the above mentioned correcting network must comprise logical circuits connected cooperatively with the output terminals of the related binary adding device, e.g., the terminals $\overline{S_{11}}$, $S_{12}$, $\overline{S_{13}}$ and $S_{14}$, and with the transfer terminals from and to the neighboring correcting networks, e.g., $\overline{Z_{11}}$ and $\overline{Z_{21}}$, respectively. This connection and the arrangement of the logical circuits serves the purpose of forming a corrected binary sum combination, e.g., $S_{12}^*$ to replace the corresponding binary sum combination in the binary order position of second lowest significance, and it must be based on the following condition expressed in terms of Boolean algebra:

$$S_{12}^*=\overline{Z_{21}}[S_{12}+(S_{13}+S_{14})(\overline{S_{11}}+Z_{11})] + S_{12}(S_{13}S_{14}+Z_{11}\overline{S_{11}})$$

However, the binary sums $S_{11}$, $S_{13}$ and $S_{14}$, i.e., the other three sums furnished by the group of four binary adders must be passed by the correcting network KW without any change.

While the above rule is fundamentally correct it has been found that for practical reasons and particularly in order to obtain uniform loads on all lines within the circuit arrangement and in order to save some components it is preferable to base the arrangement within the correcting network on a logical system which is embodied in the illustrated correcting network $KW_{10}$ and is represented by the following equation:

$$S_{12}^*=\overline{Z_{11}}\cdot\overline{\overline{Z_{21}}(\overline{S_{11}}+S_{12})+S_{12}S_{13}S_{14}} + \overline{\overline{Z_{21}}(S_{12}+S_{13}+S_{14})+\overline{S_{11}}S_{12}+S_{12}S_{13}S_{14}}$$

$$S_{12}^*=\overline{A\,\overline{B}+C} \quad \text{i.e.} \quad \overline{S_{12}^*}=A\,\overline{B}+\overline{C}$$

wherein:

$$A=\overline{Z_{11}}$$

$$\overline{B}=\overline{\overline{Z_{21}}(\overline{S_{11}}+S_{12})+S_{12}S_{13}S_{14}}$$

and $$C=\overline{\overline{Z_{21}}(S_{12}+S_{13}+S_{14})+\overline{S_{11}}S_{12}+S_{12}S_{13}S_{14}}$$

The correcting network $KW_{10}$ as illustrated comprises therefore seven AND-circuits $U_a$–$U_g$, three OR-circuits $Or_a$–$Or_c$ and six inverting amplifiers $I_a$–$I_d$ and $I_{13}$ and $I_{21}$ in the manner and arrangement illustrated in the drawing. it is easy to trace from the drawing itself that the operation of this particular arrangement exactly corresponds to the requirements stipulated above.

The output means namely the output terminals $S_{11}$, $S_{12}^*$, $S_{13}$ and $S_{14}$ of the particular correcting network $KW_{10}$ furnish a sum in the form of a four-bit combination representing the sum of the decimal digits that had to be added, this sum constituted by a four-bit combination being corrected automatically in all those cases where a correction is required as explained further above. The four-bit combination appearing in the output means as mentioned above is the binary sum of the binary four-bit combinations that originally had been stored in the storage units $DS_X$ and $DS_Y$. The transfer output bits $Z_{21}$ and $\overline{Z_{21}}$ are also available for being transferred to the next following units so that any plurality of units as the one illustrated in full detail in the drawing may be combined with each other so as to constitute a larger parallel adding arrangement capable of handling decimal numbers with a correspondingly greater number of decimal order positions.

It should be noted that the CZ-code on which the arrangement according to the invention is based satisfies all those conditions which have been known to exist for a binary code that is intended to be entirely satisfactory. These conditions are the following:

(1) The code must have a monotone increase characteristic i.e. a greater decimal digit must be represented by a correspondingly greater binary value of the four-bit combination.

(2) The addition of two four-bit combinations must be feasible in such a manner that they are first of all simply added directly as two four-bit binary numbers whereafter a correction is carried out which must be ruled by as simple a law as possible.

(3) If two decimal digits are nine-complements then also the corresponding four-bit combinations must be complements relative to each other so that one can be formed from the other by interchanging the O and L bits therein.

(4) It must be easy to distinguish between even and odd decimal digits e.g. in such a manner that these digits are also represented by even or odd bit combinations, respectively.

(5) It must be possible to apply weights to each of the four binary order positions of the bit combination in such a manner that the represented decimal digit is directly represented by the weighted L bits.

(6) It should be easy to distinguish between bit combination representing decimal digits smaller than 5 and those which represent digits equal to 5 or larger.

(7) It should be easy to memorize the code system.

It can be seen readily from the above chart that the CZ-code according to this application entirely corresponds to the above conditions.

Finally it should be noted that the arrangement according to the invention and as described above can be very conveniently combined with a known type of digital-analog converter or preferably with a digital-analog-converter as disclosed in our copending patent application Serial No. 279,039, now abandoned, in order to form in this manner an analog value which can be used for the control of servo-motor arrangements.

It will be understood that each of the elements described above, or two or more together, may also find a useful application in other types of a parallel adding arrangement for adding four-bit combinations representing decimal numbers differing from the types described above.

While the invention has been illustrated and described as embodied in a parallel adding arrangement for adding four-bit combinations representing decimal numbers in terms of a weighted-bit binary code of a particularly useful type, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a parallel arrangement for adding four-bit combinations representing decimal numbers as augends and addends in terms of a weighted-bit binary code, in combination, a series of storage units respectively assigned to different consecutive decimal order positions of decimal numbers to be added, each unit including a first and a second group of four storage elements for storing in terms of a four-bit weighted-bit binary code in said first group of elements a four-bit combination representing the decimal digit of the augend in the respective decimal order position thereof and for storing in said second group of elements a four-bit combination representing the decimal digit of the addend in the respective decimal order position thereof, each element of said first group being assigned to a different binary order position and constituting with the corresponding element of said second group assigned to the same binary order position a pair of correlated storage elements, said weighted binary code being defined by the following chart:

BIT POSITIONS $BS_n$ WITH WEIGHTS $g_x$

| Decimal Digit | BS4 g=4 | BS3 g=2 | BS2 g=2 | BS1 g=1 | BS4 g=4 | BS3 g=2 | BS2 g=2 | BS1 g=1 | Decimal Digit |
|---|---|---|---|---|---|---|---|---|---|
| 0 | O | O | O | O | L | L | L | L | 9 |
| 1 | O | O | O | L | L | L | L | O | 8 |
| 2 | O | O | L | O | L | L | O | L | 7 |
| 3 | O | L | O | L | L | O | L | O | 6 |
| 4 | O | L | L | O | L | O | O | L | 5 |

a series of binary adding devices respectively associated with said storage units, each of said adding devices including a group of four binary adders respectively connected with a different one of said pairs of correlated storage elements of the respectively associated storage unit for adding binary bits stored in said respectively connected pairs of correlated storage elements, and furnishing at its output terminal the binary sum of said bits stored in the respective correlated storage elements and, whenever applicable, a transfer bit to the following one of said adders connected with a pair of correlated elements associated with the respectively next higher binary order position, each of said adding devices having a group input for receiving a transfer bit from a preceding adding device associated with a storage unit assigned to a respectively next lower decimal order position, and a group output for transferring a transfer bit to a following adding device associated with a storage unit assigned to the respectively next higher decimal order position; a series of correcting networks respectively associated with said binary adding devices, each of said correcting networks being connected with said output terminals of the respective four binary adders of a different one of said binary adding devices, and with the respective group output and including a transfer input and logical circuit means permitting the unchanged passage therethrough of the binary sums furnished by said binary adders of the particular adding device with the exception of a selected one of said four binary adders namely the one assigned to the second lowest binary order position and converting the binary sum furnished by said selected binary adder into a corrected binary sum in accordance with the following Boolean equation:

$$S_{12}^{*}=\overline{Z_{21}}[S_{12}+(S_{13}+S_{14})(\overline{S_{11}}+Z_{11})]+S_{12}(S_{13}S_{14}+Z_{11}\overline{S_{11}})$$

wherein $S_{12}$ is the binary sum furnished by said selected binary adder, while $S_{12}^{*}$ is the corresponding corrected binary sum, $S_{11}$, $S_{13}$ and $S_{14}$ are the binary sums respectively furnished by the other three of said four binary adders, $Z_{11}$ is the transfer introduced at said group input and $Z_{21}$ is the transfer delivered at said group output; and a series of output means respectively associated with said adding devices, each of said output means comprising for a different one of said correcting networks, respectively, a group of three outputs for said binary sums passed unchanged through the particular correcting network and one output for said corrected binary sum furnished thereby.

2. In a parallel adding arrangement for adding four-bit combinations representing decimal numbers as augends and addends in terms of a weighted-bit binary code, in combination, a series of storage units respectively assigned to different consecutive decimal order positions of decimal numbers to be added, each unit including a first and a second group of four storage elements for storing in terms of a four-bit weighted-bit binary code in said first group of elements a four-bit combination representing the decimal digit of the augend in the respective decimal order position thereof and for storing in said second group of elements a four-bit combination representing the decimal digit of the addend in the respective decimal order position thereof, each element of said first group being assigned to a different binary order position and constituting with the corresponding element of said second group assigned to the same binary order position a pair of correlated storage elements, said weighted binary code being defined by the following chart:

BIT POSITIONS $BS_n$ WITH WEIGHTS $g_x$

| Decimal Digit | BS4 g=4 | BS3 g=2 | BS2 g=2 | BS1 g=1 | BS4 g=4 | BS3 g=2 | BS2 g=2 | BS1 g=1 | Decimal Digit |
|---|---|---|---|---|---|---|---|---|---|
| 0 | O | O | O | O | L | L | L | L | 9 |
| 1 | O | O | O | L | L | L | L | O | 8 |
| 2 | O | O | L | O | L | L | O | L | 7 |
| 3 | O | L | O | L | L | O | L | O | 6 |
| 4 | O | L | L | O | L | O | O | L | 5 |

a series of binary adding devices respectively associated with said storage units, each of said adding devices including a group of four binary adders respectively connected with a different one of said pairs of correlated storage elements of the respectively associated storage unit for adding binary bits stored in said respectively connected pairs of correlated storage elements, and furnishing at its output terminal the binary sum of said bits stored in the respective correlated storage elements and, whenever applicable, a transfer bit to the following one of said adders connected with a pair of correlated elements associated with the respectively next higher binary order position, each of said adding devices having a group input for receiving a transfer bit from a preceding adding device associated with a storage unit assigned to a respectively next lower decimal order position, and a group output for transferring a transfer bit to a following adding device associated with a storage unit assigned to the respectively next higher decimal order position, each of said binary adders comprising a combination of logical circuit means including AND-circuits, OR-circuits and inverting amplifier circuits for adding said bits stored in said correlated storage elements and any transfer bit received at said group input; a series of correcting networks respectively associated with said binary adding devices, each of said correcting networks being connected with said output terminals of the respective four binary adders of a different one of said binary adding devices, and with the respective group output and including a transfer input and logical circuit means permitting the unchanged passage therethrough of the binary sums furnished by said binary adders of the particular adding device with the exception of a selected one of said four binary adders namely the one assigned to the second lowest binary order position and converting the binary sum furnished by said selected binary adder into a corrected binary sum in accordance with the following Boolean equation:

$$S_{12}^{*}=\overline{Z_{21}}[S_{12}+(S_{13}+S_{14})(\overline{S_{11}}+Z_{11})]+S_{12}(S_{13}S_{14}+Z_{11}\overline{S_{11}})$$

wherein $S_{12}$ is the binary sum furnished by said selected binary adder, while $S_{12}^{*}$ is the corresponding corrected binary sum, $S_{11}$, $S_{13}$ and $S_{14}$ are the binary sums respectively furnished by the other three of said four binary adders, $Z_{11}$ is the transfer introduced at said group input and $Z_{21}$ is the transfer delivered at said group output; and a series of output means respectively associated with said adding devices, each of said output means comprising for a different one of said correcting networks, respectively, a group of three outputs for said binary sums passed unchanged through the particular correcting network and one output for said corrected binary sum furnished thereby.

3. In a parallel adding arrangement for adding four-bit combinations representing decimal numbers as augends and addends in terms of a weighted-bit binary code, in combination, a series of storage units respectively assigned to different consecutive decimal order positions of decimal numbers to be added, each unit including a first and a second group of four storage elements for storing in terms of a four-bit weighted-bit binary code in said first group of elements a four-bit combination representing the decimal digit of the augend in the respective decimal order position thereof and for storing in said second group of elements a four-bit combination representing the decimal digit of the addend in the respective decimal order position thereof, each element of said first group being assigned to a different binary order position and constituting with the corresponding element of said second group assigned to the same binary order position a pair of correlated storage elements, said weighted binary code being defined by the following chart:

BIT POSITIONS $BS_n$ WITH WEIGHTS $g_x$

| Decimal Digit | BS4 g=4 | BS3 g=2 | BS2 g=2 | BS1 g=1 | BS4 g=4 | BS3 g=2 | BS2 g=2 | BS1 g=1 | Decimal Digit |
|---|---|---|---|---|---|---|---|---|---|
| 0 | O | O | O | O | L | L | L | L | 9 |
| 1 | O | O | O | L | L | L | L | O | 8 |
| 2 | O | O | L | O | L | L | O | L | 7 |
| 3 | O | L | O | L | L | O | L | O | 6 |
| 4 | O | L | L | O | L | O | O | L | 5 |

a series of binary adding devices respectively associated with said storage units, each of said adding devices including a group of four binary adders respectively connected with a different one of said pairs of correlated storage elements of the respectively associated storage unit for adding binary bits stored in said respectively connected pairs of correlated storage elements, and furnishing at its output terminal the binary sum of said bits stored in the respective correlated storage elements and, whenever applicable, a transfer bit to the following one of said adders connected with a pair of correlated elements associated with the respectively next higher binary order position, each of said adding devices having a group input for receiving a transfer bit from a preceding adding device associated with a storage unit assigned to a respectively next lower decimal order position, and a group output for transferring a transfer bit to a following adding device associated with a storage unit assigned to the respectively next higher decimal order position; a series of correcting networks respectively associated with said binary adding devices, each of said correcting networks being connected with said output terminals of the respective four binary adders of a different one of said binary adding devices, and with the respective group output and including a transfer input and logical circuit means permitting the unchanged passage therethrough of the binary sums furnished by said binary adders of the particular adding device with the exception of a selected one of said four binary adders namely the one assigned to the second lowest binary order position and converting the binary sum furnished by said selected binary adder into a corrected binary sum in accordance with the following Boolean equation:

$$S_{12}^{*}=\overline{Z_{21}}[S_{12}+(S_{13}+S_{14})(\overline{S_{11}}+Z_{11})]+S_{12}(S_{13}S_{14}+Z_{11}\overline{S_{11}})$$

wherein $S_{12}$ is the binary sum furnished by said selected binary adder, while $S_{12}^{*}$ is the corresponding corrected binary sum, $S_{11}$, $S_{13}$ and $S_{14}$ are the binary sums respectively furnished by the other three of said four binary adders, $Z_{11}$ is the transfer introduced at said group input and $Z_{21}$ is the transfer delivered at said group output, each of said correcting networks comprising a combination of logical circuit means including AND-circuits, OR-circuits and inverting amplifier circuits cooperating for forming said corrected binary sum in accordance with the following Boolean equation:

$$S_{12}^{*}=\overline{A\,\overline{B}+C} \quad \text{i.e.} \quad \overline{S_{12}^{*}}=A\,\overline{B}+\overline{C}$$

wherein:

$$A=\overline{Z_{11}}$$

$$B=\overline{\overline{Z_{21}}(\overline{S_{11}}+S_{12})+S_{12}S_{13}S_{14}}$$

and $$C=\overline{\overline{Z_{21}}(S_{12}+S_{13}+S_{14})+\overline{S_{11}}S_{12}+S_{12}S_{13}S_{14}}$$

and a series of output means respectively associated with said adding devices, each of said output means comprising for a different one of said correcting networks, respectively, a group of three outputs for said binary sums passed unchanged through the particular correcting network and one output for said corrected binary sum furnished thereby.

4. In a parallel adding arrangement for adding four-bit combinations representing decimal numbers as augends and addends in terms of a weighted-bit binary code, in combination, a series of storage units respectively assigned to different consecutive decimal order positions of decimal numbers to be added, each unit including a first and a second group of four storage elements for storing in terms of a four-bit weighted-bit binary code in said first group of elements a four-bit combination representing the decimal digit of the augend in the respective decimal order position thereof and for storing in said second group of elements a four-bit combination representing the decimal digit of the addend in the respective decimal order position thereof, each element of said first group being assigned to a different binary order position and constituting with the corresponding element of said second group assigned to the same binary order position a pair of correlated storage elements, said weighted binary code being defined by the following chart:

BIT POSITIONS $BS_n$ WITH WEIGHTS $g_x$

| Decimal Digit | BS4 g=4 | BS3 g=2 | BS2 g=2 | BS1 g=1 | BS4 g=4 | BS3 g=2 | BS2 g=2 | BS1 g=1 | Decimal Digit |
|---|---|---|---|---|---|---|---|---|---|
| 0 | O | O | O | O | L | L | L | L | 9 |
| 1 | O | O | O | L | L | L | L | O | 8 |
| 2 | O | O | L | O | L | L | O | L | 7 |
| 3 | O | L | O | L | L | O | L | O | 6 |
| 4 | O | L | L | O | L | O | O | L | 5 |

a series of binary adding devices respectively associated with said storage units, each of said adding devices including a group of four binary adders respectively connected with a different one of said pairs of correlated storage elements of the respectively associated storage unit for adding binary bits stored in said respectively connected pairs of correlated storage elements, and furnishing at its output terminal the binary sum of said bits stored in the respective correlated storage elements and, whenever applicable, a transfer bit to the following one of said adders connected with a pair of correlated elements associated with the respectively next higher binary order position, each of said adding devices having a group input for receiving a transfer bit from a preceding adding device associated with a storage unit assigned to a respectively next lower decimal order position, and a group output for transferring a transfer bit to a following adding device associated with a storage unit assigned to the respectively next higher decimal order position, each of said binary adders comprising a combination of logical circuit means including AND-circuits, OR-circuits and inverting amplifier circuits for adding said bits stored in said correlated storage elements and any transfer bit received at said group input; a series of correcting networks respectively associated with said binary adding devices, each of said correcting networks being connected with said output terminals of the respective four binary adders of a different one of said binary adding devices, and with the respective group output and including a transfer input and logical circuit means permitting the unchanged passage therethrough of the binary sums furnished by said binary adders of the particular adding device with the exception of a selected one of said four binary adders namely the one assigned to the second lowest binary order position and converting the binary sum furnished by said selected binary adder into a corrected binary sum in accordance with the following Boolean equation:

$$S_{12}^{*}=\overline{Z_{21}}[S_{12}+(S_{13}+S_{14})(\overline{S_{11}}+Z_{11})]+S_{12}(S_{13}S_{14}+Z_{11}\overline{S_{11}})$$

wherein $S_{12}$ is the binary sum furnished by said selected binary adder, while $S_{12}^{*}$ is the corresponding corrected binary sum, $S_{11}$, $S_{13}$ and $S_{14}$ are the binary sums respectively furnished by the other three of said four binary adders, $Z_{11}$ is the transfer introduced at said group input and $Z_{21}$ is the transfer delivered at said group output, each of said correcting networks comprising a combination of logical circuit means including AND-circuits, OR-circuits and inverting amplifier circuits cooperating for forming said corrected binary sum in accordance with the following Boolean equation:

$$S_{12}^{*}=\overline{A\,\overline{B}+C} \quad \text{i.e.} \quad \overline{S_{12}^{*}}=A\,\overline{B}+\overline{C}$$

wherein:

$$A=\overline{Z_{11}}$$

$$\overline{B}=\overline{\overline{Z_{21}}(\overline{S_{11}}+S_{12})+S_{12}S_{13}S_{14}}$$

and $$C=\overline{\overline{Z_{21}}(S_{12}+S_{13}+S_{14})+\overline{S_{11}}S_{12}+S_{12}S_{13}S_{14}}$$

and a series of output means respectively associated with said adding devices, each of said output means comprising for a different one of said correcting networks, respectively, a group of three outputs for said binary sums passed unchanged through the particular correcting network and one output for said corrected binary sum furnished thereby.

No references cited.

MALCOLM A. MORRISON, *Primary Examiner.*

ROBERT C. BAILEY, *Examiner.*

K. MILDE, *Assistant Examiner.*